United States Patent [19]

Nakatsukasa et al.

[11] Patent Number: 5,251,498
[45] Date of Patent: Oct. 12, 1993

[54] DEVICE FOR MEASURING THE PHYSICAL STATE OF AN OBJECT

[75] Inventors: Eiji Nakatsukasa; Ippey Yamauchi, both of Kyoto; Susumu Takano, Shiga, all of Japan

[73] Assignee: Shimadzu Corporation, Kyoto, Japan

[21] Appl. No.: 857,431

[22] Filed: Mar. 25, 1992

[30] Foreign Application Priority Data

Mar. 27, 1991 [JP] Japan ................................. 3-63590

[51] Int. Cl.$^5$ .......................................... B60K 17/354
[52] U.S. Cl. .................................. 73/865.8; 177/245; 33/709
[58] Field of Search ................. 73/865.8, 866; 374/45, 374/46, 51, 55, 56; 33/704, 709, 783, 787–789, 806, 832, 573; 177/243, 245

[56] References Cited

U.S. PATENT DOCUMENTS

| 2,146,727 | 2/1939 | Fleischer | 177/245 |
| 2,699,060 | 1/1955 | Safford | 374/51 |
| 3,996,669 | 12/1976 | Anichini | 33/832 |
| 4,856,335 | 8/1989 | Tornberg | 73/818 |
| 5,002,399 | 3/1991 | Akinc et al. | 374/45 |
| 5,133,210 | 7/1992 | Lesko et al. | 374/46 |

FOREIGN PATENT DOCUMENTS

| 0012485 | 1/1980 | Japan | 177/245 |
| 521101 | 5/1940 | United Kingdom | 177/245 |

Primary Examiner—Robert Raevis
Attorney, Agent, or Firm—Wegner, Cantor, Mueller & Player

[57] ABSTRACT

To solve the problem that the prior device has a difficulty in performing accurate measurement of weight or dimension of a work which is placed in a furnace, the invention provides a device for measuring the physical state of the work under high temperature conditions such as a sintering furnace, which comprises: a frame for holding a work; a base on which the frame is placed; a probe having an end portion disposed for relative movement between the work and the frame; a step motor for driving the probe so that the end portion of the probe moves between the work and the frame and also lifts the frame together with the work away from the base; a microcomputer which acts together with a magnetic scale and a load cell to send a control signal to the step motor, thereby detecting a displacement of the probe and a load imposed on the probe.

5 Claims, 6 Drawing Sheets

DEVICE FOR MEASURING THE PHYSICAL STATE OF AN OBJECT

BACKGROUND OF THE INVENTION

This invention relates generally to a device for measuring the physical state of a work which is subjected to a high temperature atmosphere. More specifically, this invention relates to a device for measuring a change in the physical state of a work which is placed in a high temperature furnace by measuring the weight and dimension of the work.

As is well known, various objects or bodies of different materials, often referred to as works in the art, are treated or otherwise processed in a variety of high temperature furnaces. One example of such high temperature furnaces is a sintering furnace.

A typical work to be processed in the furnace is a body formed by powder metals or ceramics. The molded body or sample is made of a raw material mixed with wax and formed into a desired shape. The molded body is first dewaxed in the furnace and then subjected to a sintering process. Dewaxing is a process in which the molded body is heated in the furnace thereby to remove the wax contained in the molded body. If, in the course of the process, the temperature and pressure within the furnace are not controlled properly, the wax within the molded body vaporizes too quickly, or sintering proceeds at an unusually fast rate. This causes undesired cracks in and disfigurement of the molded body. In the past, however, it was next to impossible to perform a real-time measuring of any physical change that takes place within the work as it is processed in the furnace. In order to address these problems, it has been a common practice in the prior art to closely examine the works with cracks and fissures formed as they are taken out of the furnace in the midst of the sintering process, and adjust the temperature and pressure conditions in an effort to establish the optimum operation of the furnace for future processing which will eliminate or reduce to a minimum cracks and unwanted distortion in the molded bodies.

These conventional techniques for establishing the optimum operating conditions for the furnace have an inherent drawback that they largely depend on the skill and judgment of a seasoned operator and, therefore, lack objective criteria for selecting operating conditions, with a resulting poor yield of final products.

In the face of the problems, it has been attempted in recent years to install within a furnace various mechanisms for measuring the weight or dimension of a work to be treated in the furnace. With these measuring mechanisms, the weight of a sample body is determined by supporting it by the weight measuring mechanism, or else the vertical dimension of the sample body is measured by detecting by a sensing rod the distance between a position of the upper surface of the sample body and a position of a base on which the sample body is placed. However, the prior art arrangement is disadvantageous in that two separate measuring mechanisms must be provided at different locations, making the entire structure bulky and complex. Moreover, the weight and dimension measurement with the conventional arrangement is quite prone to error since the device has a pressure difference in the furnace, in order to prevent wax from staining the heat insulating material. This pressure difference causes error in weight measurement by changing the force on the supporting element of the work. Also, it causes error in dimension measurement by changing the contact force of the sensing rod which is placed on the work.

SUMMARY OF THE INVENTION

This invention has been made with the above-mentioned problems in mind, and its purpose is to provide a device for measuring the physical state of an object which can solve the problems.

In accordance with the invention, there is provided a device for measuring the physical state of an object under high temperature conditions, which comprises: a frame for holding an object; a base on which the frame is placed; a probe having an end portion disposed for relative movement between the object and the frame and for lifting the frame together with the object away from the base; displacement detecting means for detecting a displacement of the probe, and load detecting means for detecting a load imposed on the probe. The device of the invention is characterized in that the vertical dimension of the object is obtained from the amount of relative displacement of the probe detected by the displacement detecting means, and the weight of the object is obtained from the load difference detected by the weight detecting means.

In order to eliminate measurement errors due to thermal distortion within the frame, a compensator may be added. The vertical dimension of the compensator and the vertical dimension of the support frame are determined in relation to their coefficients of linear expansion, so that the maximum allowable displacement of the probe in its longitudinal direction is substantially kept constant without being affected by the thermal distortion of the frame caused by changes in the ambient temperature. The probe may be so designed as to be able to measure a very fragile object.

In this arrangement, the end portion of the probe is modified into a subprobe and its holder. The subprobe is lifted after it makes contact with the object, so that the contact force on the object is restricted within the weight of the subprobe.

In order to get rid of adverse effects on the object by a buoyant force caused by the gas density in the furnace as well as by the gain drift of the load detecting means, the object that is supported by the probe may be oscillated by a drive mechanism for moving the probe vertically up and down. The waveform of the oscillation that appears in the output from the load detecting means may be electrically processed, and the mass of the object is obtained from the well-known equations of the oscillating system.

The impedance of an object helps to determine such physical properties of the object as carbon content. The impedance of the object may be obtained from the impedance between the probe and that of the base when the probe is in contact with the object, the impedance therebetween when the probe is in contact with the support frame without lifting it, and the impedance of the support frame itself.

The device of the invention is so designed as to measure cyclically or intermittently changes in the weight and dimension of an object by moving a probe upward and downward. Generally, the object being measured changes very slowly as compared with the measuring procedure, so that the intermittent steps of measurement may be regarded as being done simultaneously. As a result, it becomes possible to make an accurate measurement of both the weight and the dimension by means of a single mechanism. The single integrated probe is simple in construction and the device gets a less adverse effect of the temperature in the furnace. In accordance with the invention, the vertical dimension of the object is determined by the amount of displacement of the end portion of the probe between the object and the frame, and the displacement of the probe corresponds accurately to the displacement of the end portion of the probe, measurement errors which would result from thermal expansion of the probe or the base are effectively canceled unless such expansion undergoes a great change in the course of a single measuring process.

The above-mentioned error of displacement is caused outside the frame. Unless any remedial measures are taken within the frame, the frame which tend to expand due to thermal distortion may cause a change in the maximum allowable displacement or relative displacement of the end portion of the probe. In the device of the invention, provision is made to keep the maximum allowable displacement of the end portion of the probe at a constant level regardless of thermal distortion. With the provision, any error that occurs within the frame can effectively be canceled.

In the arrangement that a subprobe is disposed on the end of the probe and restricts the contact force on the object within the weight of the subprobe, a very fragile object can be measured without being damaged by the probe.

In the arrangement of the invention that a change in the mass of the object is obtained from the waveform of oscillation of the probe, the equation used does not contain such items as the gas density and the gain of the load detecting means, so that an accurate measurement may be realized without being affected by a buoyant force applied on the object or by the gain drift of the detecting means.

The arrangement of the invention that the probe is used as a contact point in an electric circuit for measuring the impedance of the object is effective in avoiding problems associated with the thermoelectrical properties in circuit elements. That is, the impedance between the impedance meter and the object can be eliminated.

BRIEF DESCRIPTION OF THE DRAWINGS

The present invention will be understood more fully from the detailed description given below and from the accompanying drawings of the preferred embodiments of the invention.

In the drawings.

DESCRIPTION OF THE PREFERRED EMBODIMENTS

Now, some preferred embodiments of the invention will be described in detail with reference to the drawings.

FIRST EMBODIMENT

Figure 1:
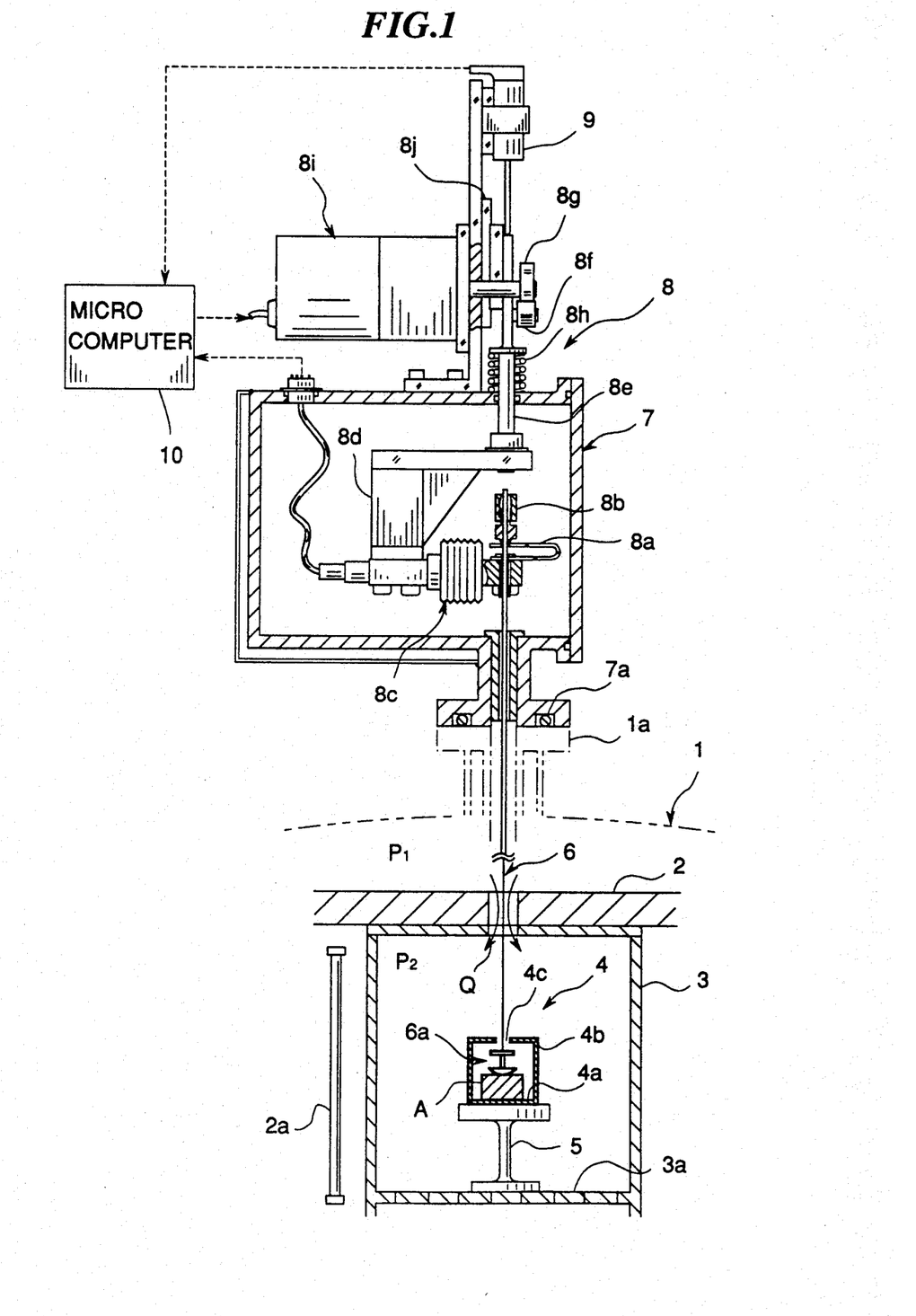
FIG. 1 is a cross-sectional view of a device according to a preferred embodiment of the invention as applied to a sintering furnace.

Referring to FIG. 1, there is shown a measuring device according to one embodiment of the invention as incorporated in a sintering furnace. The furnace 1 includes a inner box 3, a heater 2a, a furnace chamber 1 and a heat-insulating material 2. Within the inner box 3, a work A to be measured is housed. The work A is held on the bottom surface 4a of a frame 4, which is in turn supported on a furnace bed 3a of the inner box 3 via a base 5. A probe 6 is suspended through the chamber 1, the heat-insulating material 2 and the inner box 3 to extend into the frame 4. The probe 6 is provided at its end with a diametrically enlarged portion 6a. The enlarged end portion 6a is held by the probe 6 for relative displacement between the top surface of the work A and the top wall 4b of the frame 4. As the probe 6 is pulled upward with the enlarged end member 6a abutting on the lower surface of the top wall 4b of the support frame 4, the support frame 4 is lifted upward together with the work A away from the base 5.

The chamber 1 has a top-end opening 1a, to which a subchamber 7 is connected with seal elements 7a. A drive mechanism 8 supports the probe 6 which extends into the subchamber 7 for upward and downward movement. The drive mechanism 8 includes a load cell 8c to which the probe 6 is connected by a holder 8b via a leaf spring 8a; an arm 8d for supporting the fixed end of the load cell 8c; a rod 8e extending upward from the arm 8d out of the subchamber 7; a counter-spring 8h for biasing the rod 8e upward so that a cam follower 8f provided on the rod 8e comes into pressure contact with a cam 8g; a step motor 8i with gear reduction for driving the cam 8g and the mating cam follower 8f to move the rod 8e vertically upward or downward into a desired position; and a linear guide 8j for guiding the upward and downward motion of the rod 8e. The load imposed on the probe 6 is continuously taken out of the load cell 8c as an electrical signal. A magnetic scale 9 which is provided in contact with the rod 8e generates an electric signal indicative of the vertical displacement of the rod 8e, which corresponds to the vertical displacement of the end portion 6a of the probe 6.

Figure 6:
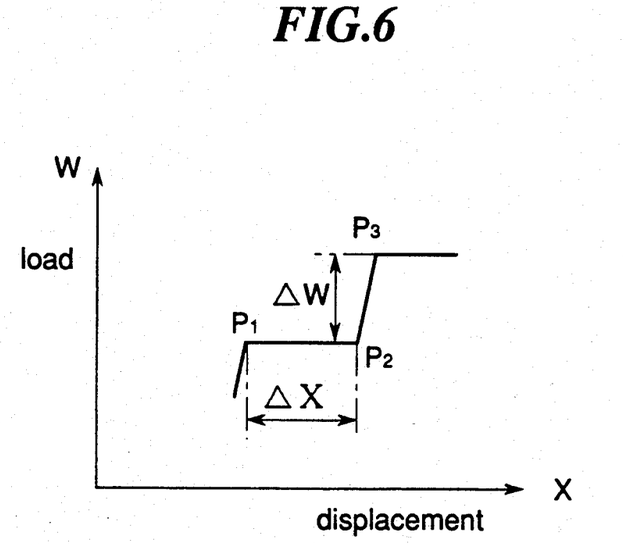
FIG. 6 is a graphical representation showing the relation between the displacement X detected by a magnetic scale and the load W detected by a load cell as the probe moves between an object and the frame.

The step motor 8i, the magnetic scale 9 and the load cell 8c are connected to a microcomputer 10. The microcomputer 10 forms together with the magnetic scale 9 and the load cell 8c a displacement and load detecting mechanism, and detects changing relations as shown in FIG. 6 between the displacement X of the rod 8e detected by the magnetic scale 9 and the load X detected by the load cell 8c. With reference to the values detected by the load cell 8c and the magnetic scale 9, the microcomputer 10 determines from the changes of the detected values whether the enlarged end 6a of the probe is in contact with the work A (as shown at $P_1$ in FIG. 6), or whether it is in contact with the under surface of the top wall 4b of the frame 4 (as shown at $P_2$ in FIG. 6), or else whether it has pulled the frame 4 upward together with the work A (as shown at $P_3$ in FIG. 6).

According to the device of the invention, the load imposed on the probe 6 when the enlarged end 6a of the probe 6 has pulled up the frame 4 is compared with the load imposed on the probe 6 when the end 6a does not pull up the frame to obtain a difference $\Delta W$ between the two loads. The weight $W_0$ of the work A is then figured out by subtracting the weight of the frame 4 from the weight difference $\Delta W$.

Figure 2:
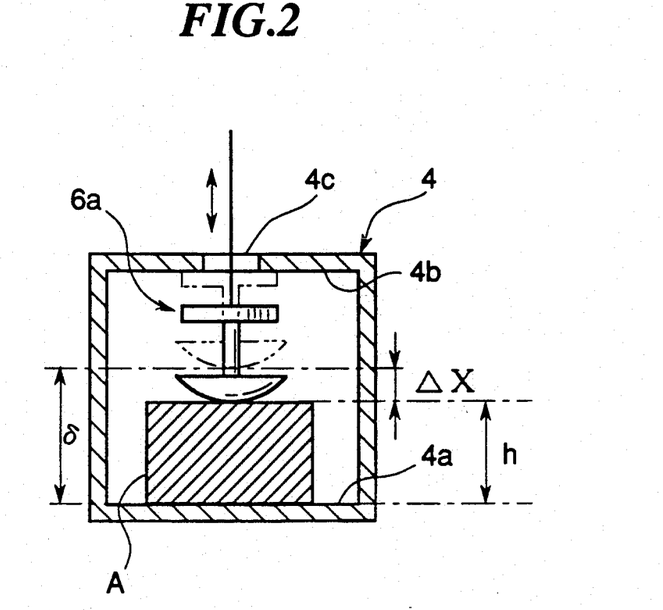
FIG. 2 is an enlarged fragmental view in cross section showing a probe disposed for movement within the frame of the device shown in FIG. 1.

Since the displacement of the end 6a of the probe 6 corresponds to the reading of the magnetic scale 9, the vertical dimension h of the work A is obtained first by determining a relative displacement $\Delta X$ of the rod 8e when the end 6a of the probe 6 moves from the work A to the lower surface of the top wall 4b of the frame 4 without lifting the frame 4, and then by subtracting the relative displacement $\Delta X$ from a maximum allowable displacement $\delta$ of the end 6a of the probe (FIG. 2).

With the arrangement of the present device, the weight and dimension of the work are measured cyclically or intermittently by moving the probe 6 up and down. Since any change in the physical state of the work A such as an injection-molded body proceeds very slowly as compared with the intermittent measuring steps, the measuring steps can be regarded as having been taken simultaneously. As a consequence, it becomes possible to make an accurate measurement of both the weight and dimension of a work A by means of a single mechanism. The single integrated probe is simple in construction and the device gets a less adverse effect of the temperature in the furnace.

According to the present device, the vertical dimension of the work A is obtained from the amount of relative displacement of the rod 8e which occurs when the end 6a of the probe 6 is allowed to move within the frame 4. Therefore, even if the probe 6 or base 5 expands due to thermal distortion, the relative displacement $\Delta X$ of the end 6a of the probe 6 corresponds accurately to the relative displacement of the rod 8e, so that measurement errors which would otherwise result from thermal expansion of the probe 6 or base 5 are effectively canceled unless a great expansion occurs in the course of a single measuring process.

When there is a pressure difference of, for example, $P_1 - P_2$ between the outside and inside of the inner box 3 (as shown in FIG. 1), with a resulting flow O of carrier gas into the inner box 3 applying a force onto the probe 6, then the load on the probe 6 as detected by the load cell 8c inevitably involves some measurement error. With the device of the invention, such measurement error is effectively canceled out unless the pressure difference $P_1 - P_2$ undergoes a great change in a single measuring process since the present device FIGURES out the weight difference $\Delta W$ at first, so that the pressure applied on the probe 6 is canceled effectively. Also, since the contact force of the probe 6 on the work A is controlled by the microcomputer 10 at an appropriate level, the pressure difference has no effect on the measurement of dimension.

It should be noted that the invention is not limited to the illustrated embodiments, but various modifications are possible within the scope of the invention. So long as the elastic moduli of the probe 6 and the load cell 8c are adequate, the spring 8a may be omitted.

Figure 5:
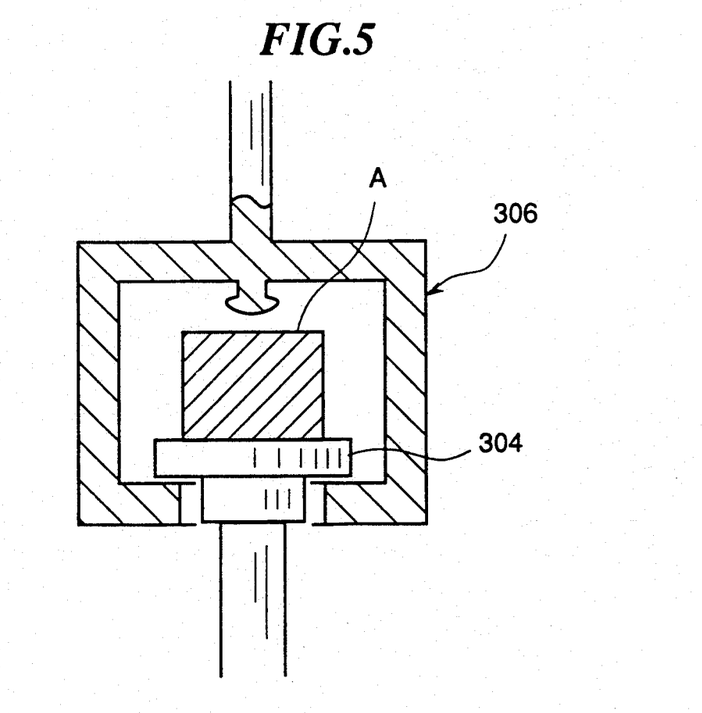
FIG. 5 is a view similar to FIG. 2 of a modified form of the device.

In the arrangement of FIG. 5, the probe 6 has a end protion 306 which has a generally U-shaped cross section, and the frame 304 is in the form of a plane member. As the probe 306 moves upward, it comes into engagement with the bottom surface of the frame 304 and lifts the frame together with the work A.

SECOND EMBODIMENT

Figure 3:
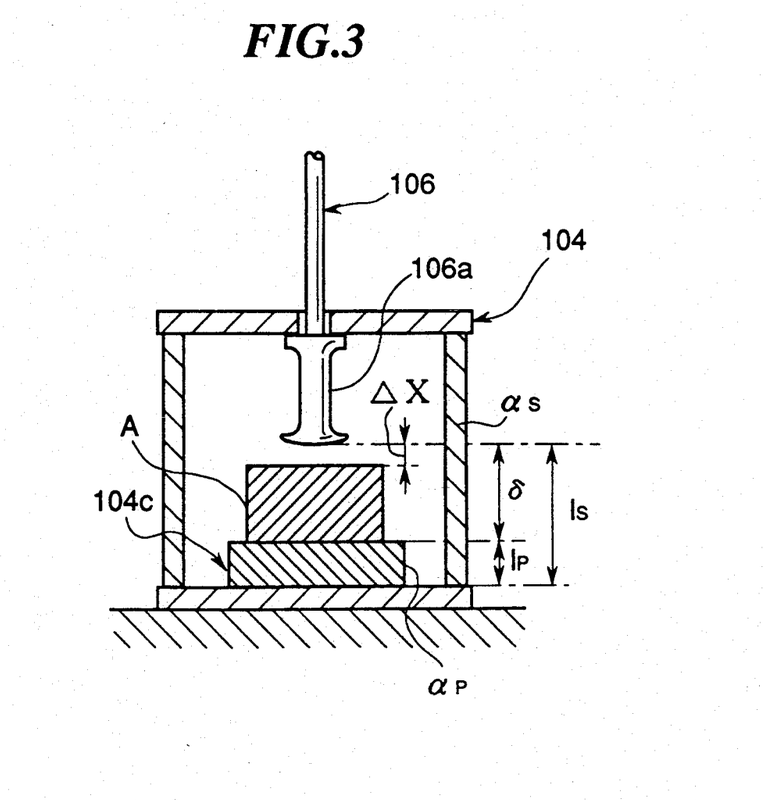
FIG. 3 is a view similar to FIG. 2 of a device according to another preferred embodiment of the invention.

A device according to the second embodiment of the invention contemplates to eliminate errors in the relative displacement of the probe that cannot effecitvely be canceled out by the preceding embodiment. The only error that can be canceled by the device of the first embodiment is the one which is caused outside the frame 4. Errors will be produced within the frame 4 as the vertical dimensions of the frame and the end 6a of the probe 6 change due to thermal expansion, causing a change in the maximum allowable displacement $\delta$ of the probe. If the temperature of the frame is measured correctly, an electrical compensator may be possible. But it is usually difficult. Therefore, with the device of the second embodiment, as shown in FIG. 3, a compensator 104c is placed between the frame 104 and the probe 106, and the vertical dimension $l_p$ of the compensator 104c and the vertical inner dimension $l_s$ of the frame 104 are determined to fulfill the following equation with respect to their coefficients $\alpha P$ and $\alpha s$ of linear expansion.

$$\alpha s \cdot ls = \alpha p \cdot lp$$

With this arrangement, the maximum allowable displacement $\delta$ is kept approximately constant without being adversely affected by a change in the ambient temperature. As a result, any error within the frame 4 is eliminated, thereby improving measurement accuracy.

THIRD EMBODIMENT

Figure 4:
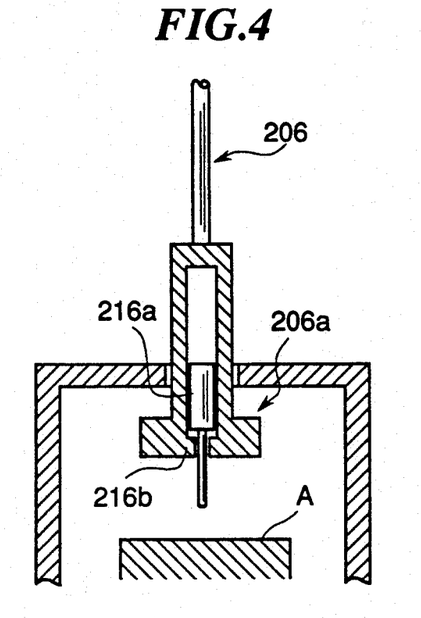
FIG. 4 is a view similar to FIG. 2 of a device according to another preferred embodiment of the invention.

A device according to the third embodiment of the invention is essentially the same as that of the first embodiment, but a modification is made to enable the measurement of a very fragile work A. For the purpose, as shown in FIG. 4, the end 206a of the probe 206 is composed of a subprobe 216a and it's holder 216b. In this case, after the subprobe 216a touches the work A, it is lifted from its holder 216b, so that the contact force on the work A is restricted with in the weight of the subprobe 216a. With this arrangement, it is possible to effectively measure the weight and dimension of a very fragile work A.

FOURTH EMBODIMENT

Figure 7:
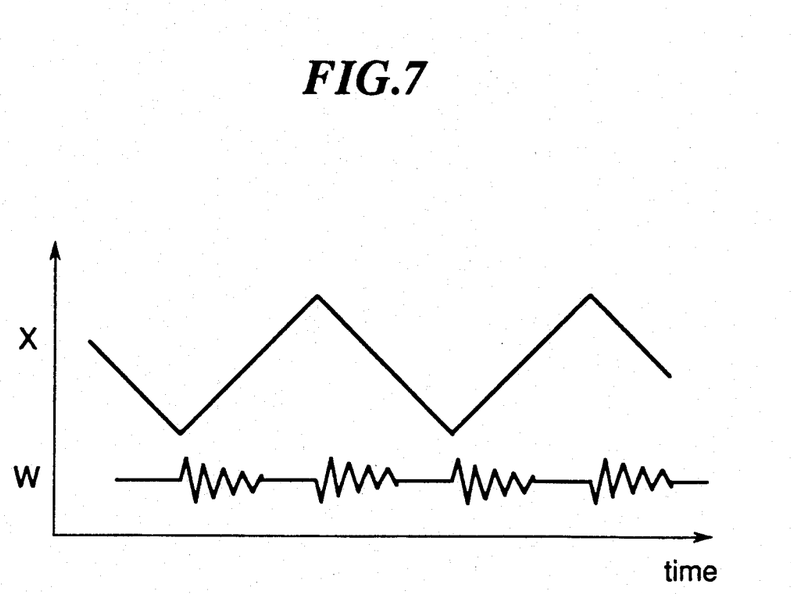
FIG. 7 is a graphical representation of the displacement X and the load W, with oscillations appearing in the detected load W as the magnetic scale changes its directions of movement.

A device according to the fourth embodiment of the invention is intended to obtain the mass of the work A from the oscillating waveform of the value detected by the load cell 8c by feeding it into a signal processing means such as the microcomputer 10 as described in connection with FIG. 1. In the device of FIG. 1, if the probe 6 is moved up and down by the drive mechanism 8 while lifting the work A together with the frame 4, the value W detected by the load cell 8c oscillates each time the displacement X of the rod 8e changes its direction as shown in FIG. 7. In this case, as there is a correlation between the waveform of the load W on the load cell 8c and the oscillation of the work A, the angular velocity $\omega$ and the damping factor n of the oscillating system can be obtained from the waveform of the load W. First, the angular velocity ω and the damping factor n are obtained according to the following well-known equation:

$$f = Ae^{-nt}(\cos\omega t + \alpha)$$

where A is the initial amplitude, and α is the initial phase angle. For this purpose, the microcomputer processes the value detected by the load cell 8c. The angular velocity ω is obtained from the cycle time of the waveform, and the damping factor n is obtained by the decaying ratio of the waveform. The mass m of the oscillating system is given by the following equation:

$$\omega = \sqrt{k/m - n^2}$$

where k is the elastic modulus of the oscillating system which is obtained beforehand. The value m includes the mass of the probe 6 in addition to the mass of the work A and the mass of the frame 4, and by subtracting the mass of the probe 6 and the frame from the value m, the mass of the work A is obtained.

With this method, measurement can be made without being influenced by the buoyant force that acts on the work A particularly under high pressure gas environment, or by the gain drift of the load cell 8c, with resulting further improvement of the accuracy of weight measurement.

FIFTH EMBODIMENT

Figure 8:
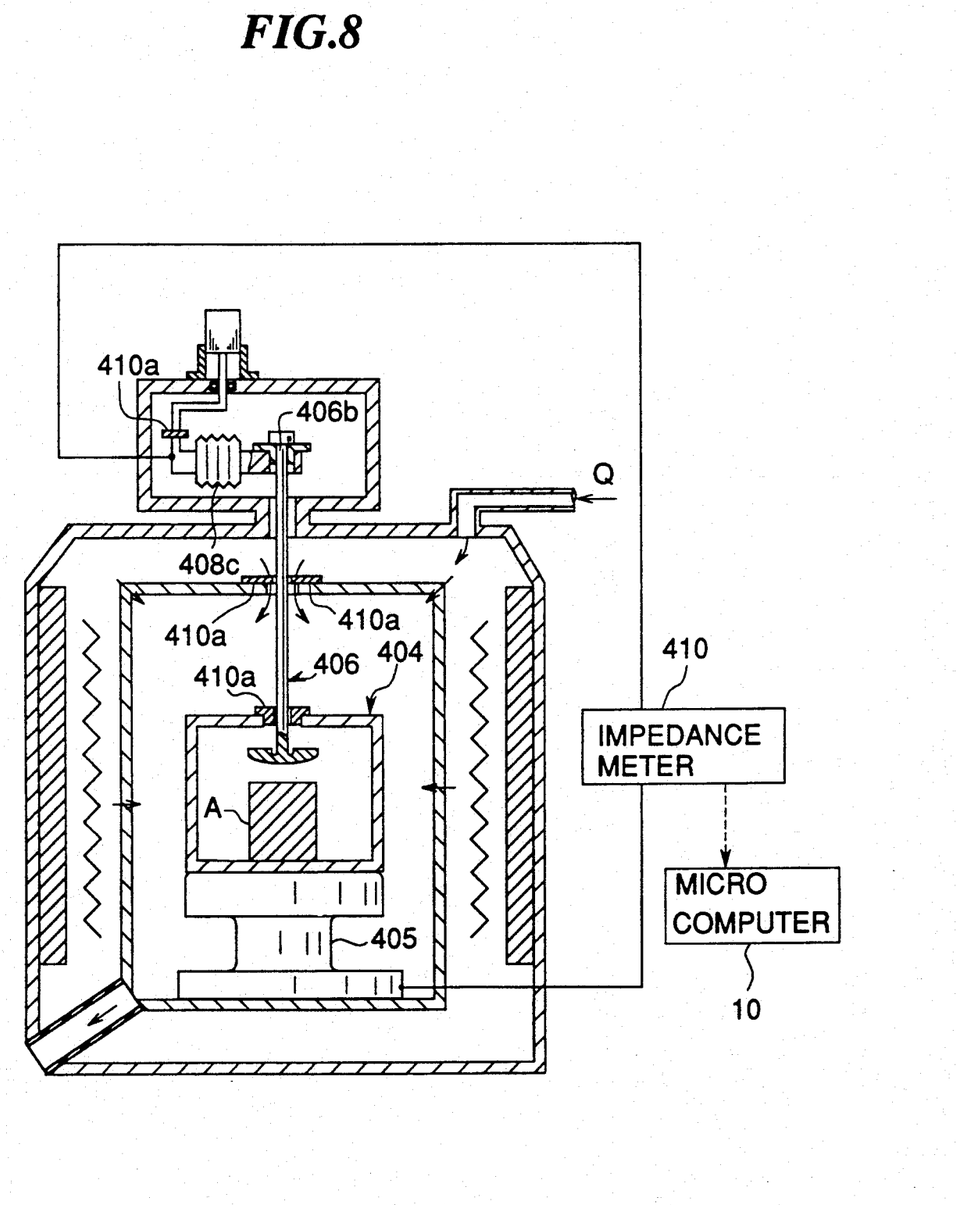
FIG. 8 is a cross-sectional view of a device according to still another embodiment of the invention as applied to a vacuum sintering durnace and having an impedance measuring equipment.

A device according to the fifth embodiment of the invention is essentially the same as that of the first embodiment, and so modified as to enable measurement of the impedance of the work A. For that purpose, as shown in FIG. 8, an impedance meter 410 is connected between the end of the load cell 408c and a base 405 in the furnace. A reference numeral 410a indicates an electrically insulating material. The amount of impedance measured by the impedance meter 410 is supplied to a microcomputer 10.

Figure 9:
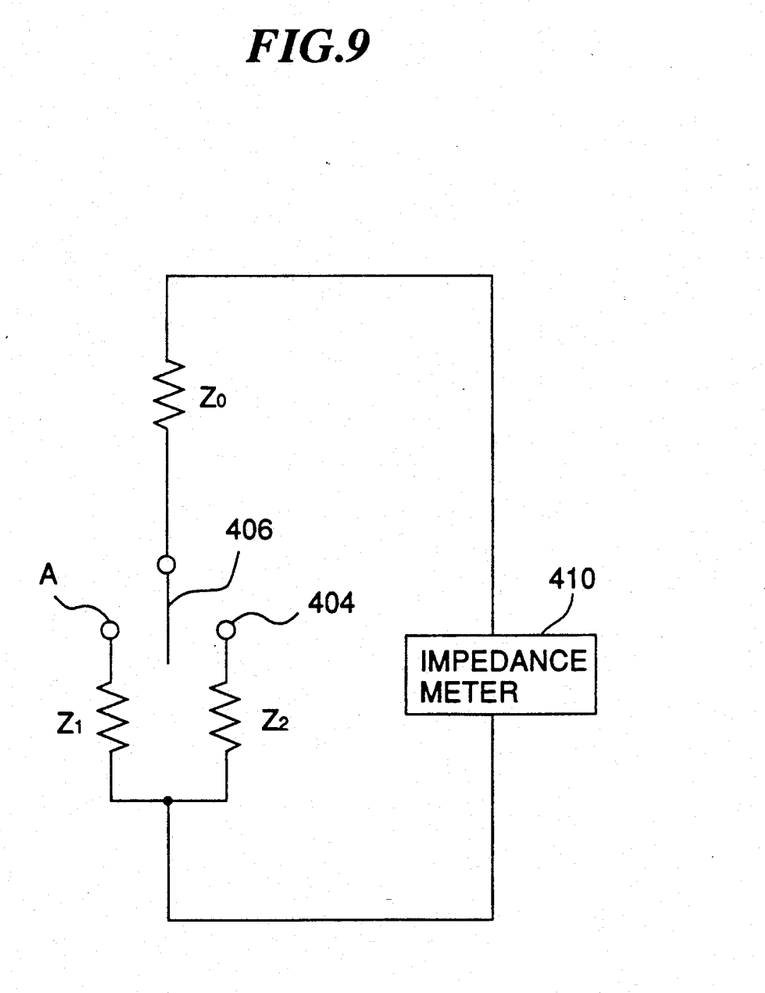
FIG. 9 is a diaphragm showing an electrically equivalent circuit included in the device of FIG. 8.

FIG. 9 illustrates an electrically equivalent circuit of this device. $Z_1$ indicates the impedance of the $Z_0$ indicates the circuit impedance between these members and the impedance meter 410. The impedance $Z_1 + Z_0$ is measured when the probe 406 is in contact with the work A, and the impedance $Z_2 + Z_0$ is measured when the probe 406 is in contact with the frame 404 without lifting it. By subtracting the latter from the former impedance, the impedance $Z_0$ is eliminated to obtain the difference $Z_1 - Z_2$, to which the known impedance $Z_2$ of the frame 404 is added to obtain the impedance $Z_1$. Based on the value of $Z_1$ thus obtained, the amount of carbon contained in the work A may be estimated for carbon control, or the dielectric constant thereof may be estimated to keep it at a proper level.

In contrast to the prior art device in which electric lead wires from a pair of electrodes are attached to the work A, the present arrangement eliminates $Z_0$ between the impedance meter 410 and the work A, so that it is possible to enhance the accuracy of measurement.

In case there is no need to measure the reactance of the work A and it is enough to determine the resistance thereof, an ohmmeter may be used instead of the impedance meter. Also, if the furnace is made of a good electrically conductive material, a lead wire may be attached to the exterior of the furnace wall instead of the wire extending from the base 405 out of the furnace. Measuring the impedance only when the contact pressure of the probe on the work at an appropriate level is useful in preventing the surface of the work A from being damaged by arc discharges. Otherwise, which will occur when a probe touch on the work or frame.

As has been described above in detail, the device of the invention utilizes only a single probe and is able to measure any change in the physical state of an object placed in a heated atmosphere with pressure difference with high accuracy of measurement nearly continuously. The device of the invention is advantageous in that it is simple in construction and suffers little adverse influence from the furnace temperature. Further, in the device of the invention the vertical dimension of an object to be measured is obtained from the relative displacement of the probe as it is moved up and down so that any measurement errors which would be caused by the change of the probe length due to thermal distortion may be canceled, with resulting enhanced accuracy of measurement. In addition, the device of the invention is able to cancel measurement errors that might be caused by thermal distortion of the object within the frame, with resulting further improvement of the accuracy of measurement. It is possible with the device of the invention to measure a very fragile object by a subprobe with which the contact force on the object is effectively reduced.

In addition, the present device is able to measure a change in the mass of an object through the oscillation of the object, so that an accurate measurement can be made without being adversely affected by a buoyant force acting on the object or the gain drift of the load cell. With the arrangement of the invention that the probe is brought into alternate contact with the object and the frame, the impedance of the object is measured with the probe incorporated as part of an electric circuit. This arrangement eliminates the need to compensate the impedance of circuit elements and ensures a more accurate measurement free from errors that might otherwise be caused by the thermoelectrical resistance change of the wiring.

What is claimed is:

1. A device for measuring the physical state of an object comprising:

frame means for holding said object;

base means for supporting said frame means;

a probe having an end portion and disposed for movement relative to said object and said frame means;

drive means for causing relative movement of said probe so that said end portion of said probe moves between said object and said frame means and for lifting said frame means together with said object away from said base means;

first detecting means for detecting a relative displacement of said probe;

and second detecting means for detecting a load imposed on said probe;

signal processing means for processing the signal from both said detecting means and for controlling said drive means;

whereby a change in the vertical dimension of said object and a change in the weight of said object are measured substantially simultaneously.

2. The device as set forth in claim 1, further including;

compensator means for canceling the linear expansion of said frame means;

the vertical dimension of said compensator means and the vertical dimension of said frame means being determined in relation to their coefficients of linear expansion so that the maximum allowable displacement of said end portion of said probe may be kept constant regardless of change in the ambient temperature.

3. The device as set forth in claim 1, further including;

a subprobe having a predetermined weight;

means formed on said probe for supporting and guiding said subprobe;

whereby said subprobe is lifted by said object after said subprobe makes contact with said object, so that the contact force on said object is limited within the weight of said subprobe.

4. The device as set forth in claim 1, wherein said drive means operates to cause said object to oscillate while said object is being lifted by said probe; and further including;

signal processing means for regarding the waveform of the signals detected by said second detecting means as the waveform of displacement of the mass of the whole oscillating system to figure out the mass from the angular velocity and damping factor in the waveform.

5. The device as set forth in claim 1, further including;

an impedance meter connected at one end to said probe and at the other end to said base means; and means for obtaining the impedance of said object from the impedance value provided by said impedance meter when said probe is in contact with said object, the impedance value provided by said impedance meter when said probe is in contact with said frame means without lifting said frame means, and a predetermined known impedance of said frame means.

* * * * *